United States Patent

[11] 3,561,597

| [72] | Inventor | William Dudley Youngblood<br>404 Calero Ave., San Jose, Calif. 95123 |
|---|---|---|
| [21] | Appl. No. | 815,397 |
| [22] | Filed | Apr. 11, 1969 |
| [45] | Patented | Feb. 9, 1971 |

[54] GAUGING AND AGITATOR MEANS FOR DROPOUT-TYPE FRUIT GRADER
5 Claims, 5 Drawing Figs.

| [52] | U.S. Cl. | 209/97 |
|---|---|---|
| [51] | Int. Cl. | B07c 5/04 |
| [50] | Field of Search | 209/97, 98, 101, 106, 102 |

[56] References Cited
UNITED STATES PATENTS

| 2,702,118 | 2/1955 | James | 209/82 |
|---|---|---|---|
| 2,353,941 | 7/1944 | Stebler | 209/106 |
| 2,782,922 | 2/1957 | Bertinot | 209/106X |

*Primary Examiner*—Richard A. Schacher
*Attorney*—Leslie M. Hansen

ABSTRACT: Gauge tracks for supporting the louver plates of a drop-flap-type fruit grader at any desired level to form dropout openings of various sizes in combination with an agitator for agitating a promiscuous mass of fruit therebetween to assure separation of the fruit according to size determined by the openings thus formed.

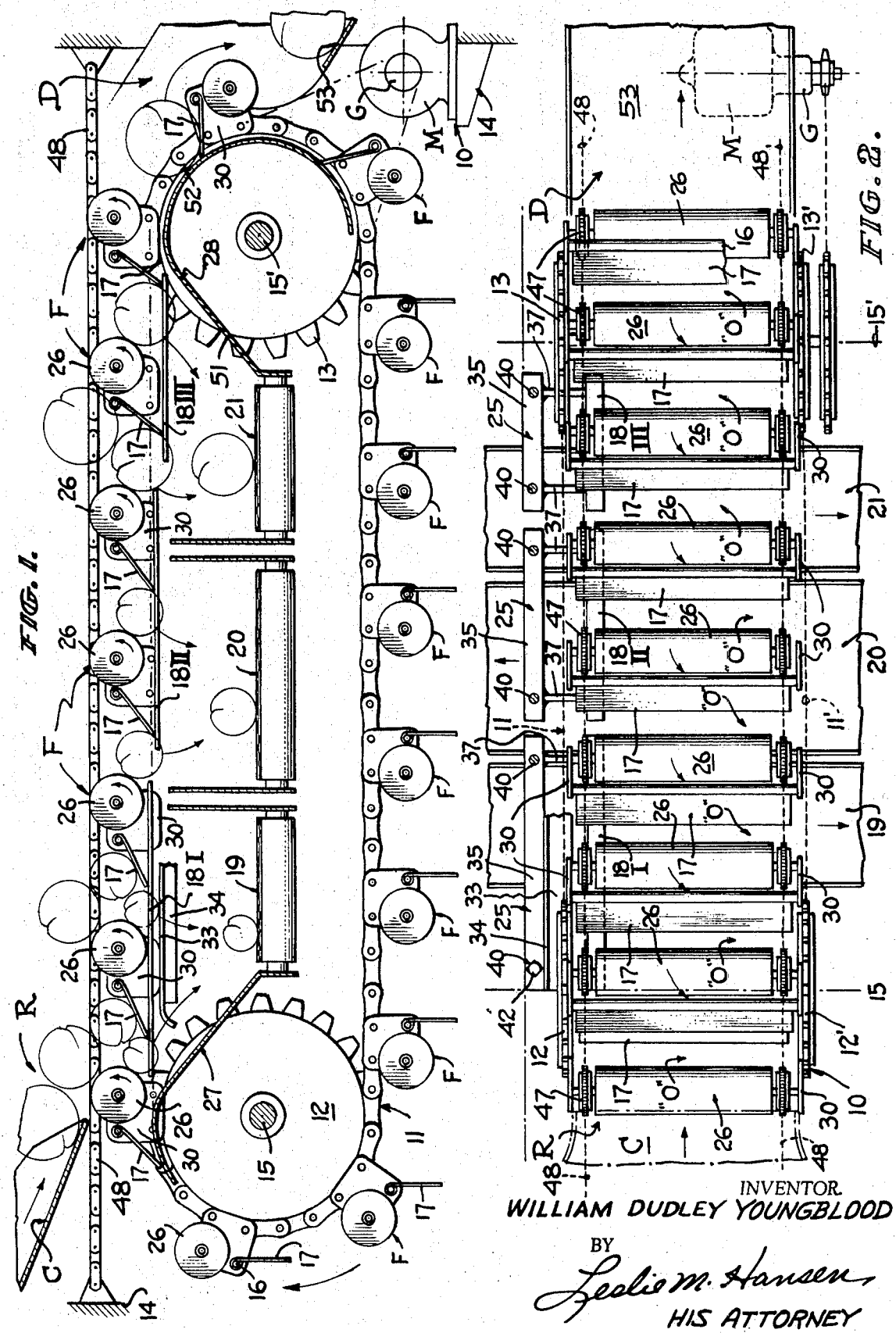

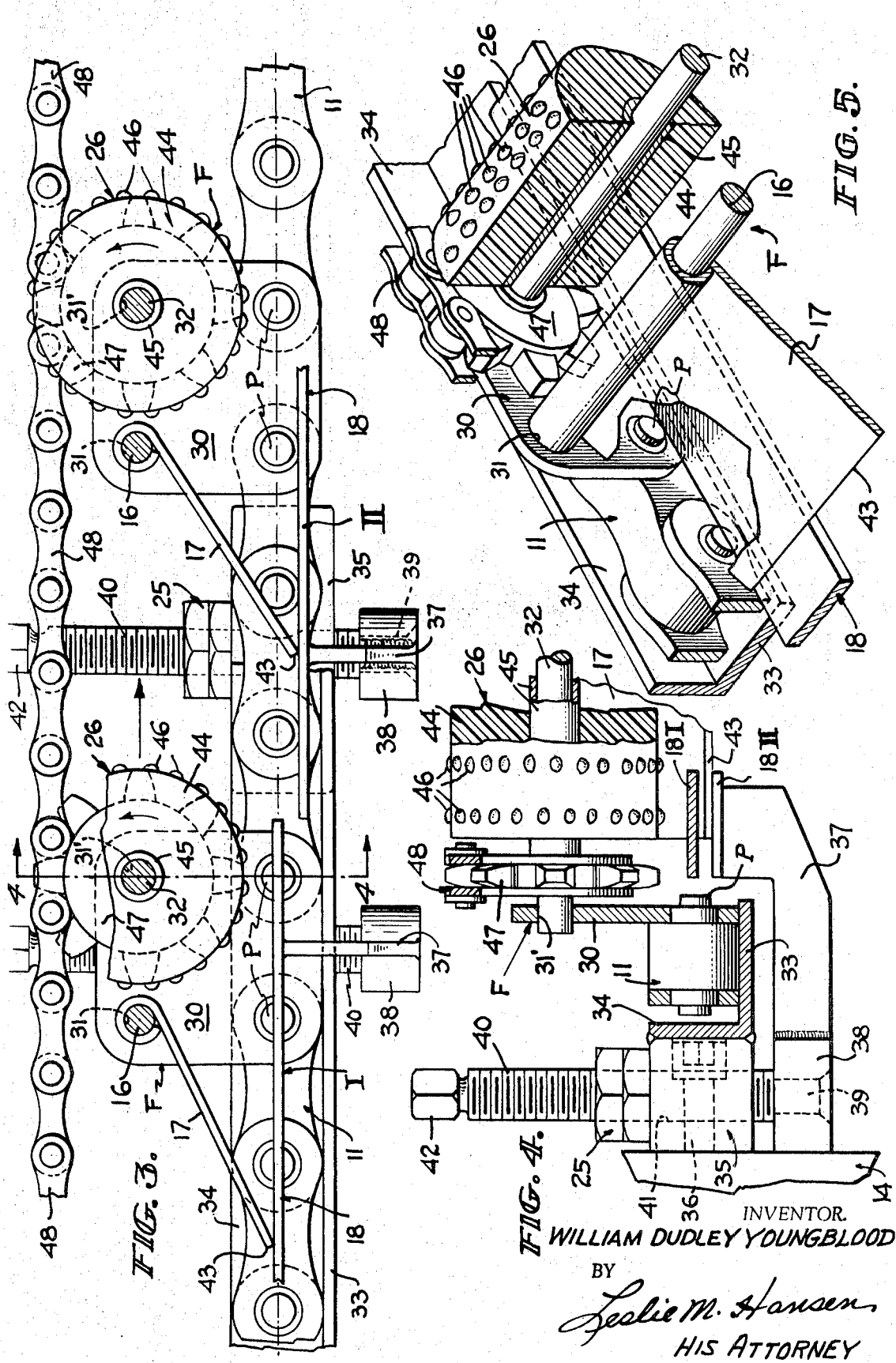

GAUGING AND AGITATOR MEANS FOR DROPOUT-TYPE FRUIT GRADER

BACKGROUND

This invention relates to fruit graders and more particularly to certain novel improvements in apparatus for grading and separating fruit according to size.

Apparatus for grading and separating fruit according to size have been known in the art for many years. One of the most common form of sizer has been the use of screening of square openings through which smaller fruit are sifted out while larger fruit pass on to screening of greater square openings. Another form has been the use of a series of plates having various stages, the first of which having apertures of smaller diameter, the next having slightly larger apertures and so forth whereby fruit are separated according to size as they pass over consecutive plates.

More closely related to the present invention is the disclosure of U.S. Pat. No. 475,497 to Fleming showing a fruit grader consisting of a series of drop flaps carried by side chains forming a table over which the fruit travels and means for gradually opening such flaps along the length of such table to discharge fruit of different sizes at progressive stages. A still later patent, U.S. Pat. No. 2,702,118 to J. James shows a fruit grader, but with stationary dropout flaps in stages over which fruit rolling means pass to move the fruit along to different dropout flaps and stages.

THE PRESENT INVENTION

The present invention relates to improvements in drop-flap-type fruit graders and has a one object to provide different sets of independently adjustable gauge tracks affording substantially uniform dropout openings at the various stages of discharge.

It is another object to provide means for agitating the fruit in relation to the dropout flaps to minimize clogging thereof and to assure complete grading of the fruit according to size.

These and other objects and advantages of the improvements of the present invention will become apparent from a reading of the following description in the light of the accompanying two sheets of drawings in which:

FIG. 1 is a longitudinal section through a fruit-sizing grader embodying the present invention.

FIG. 2 is a plan view of the apparatus of FIG. 1 with parts broken away for purposes of illustration.

FIG. 3 is an enlarged fragmentary section of a portion of the fruit-separating path and flights of FIGS. 1 and 2.

FIG. 4 is a vertical section through FIG. 3 taken substantially along line 4–4 therein.

FIG. 5 is a fragmentary perspective view of a portion of the flights of FIGS. 3 and 4.

GENERAL DESCRIPTION

Referring to FIGS. 1 and 2 the present invention has its embodiment in an apparatus 10 of the type including a pair of endless chains 11–11' trained around sprockets 12–12' and 13–13' at each end of a suitable frame 14. The sprockets 12–12' and 13–13' are mounted on shafts 15–15' journaled in a conventional manner in suitable bearings provided on the frame 14. One of the shafts 15' is drivingly connected to a source of motivating power M through a gear box G at the discharge end D of the frame 14.

The chains 11–11' have flights F of cross rods 16 supported thereon in spaced relation along their length. Each rod 16 has a louver plate 17 pivotally mounted thereon to normally hang therefrom by gravity. At the upper reach of the chains 11 and 11' the louver plates engage an inwardly projecting shoulder member 18 to support the plates 17 at various angles such as to leave dropout openings O of various widths between adjacent flights upon the chains as they advance.

As best illustrated in FIG. 1 fruit received promiscuously from a chute C at the receiving end R of the apparatus 10 will be conveyed from left to right toward a discharge end D. The openings O adjacent the receiving end R being of lesser width allows the smaller fruit to drop out while larger fruit continues to be conveyed until the louver opening matches their size.

The fruit thus separated falls through to transverse conveyors 19, 20 and 21 beneath the upper reach of the chains 11–11' and sizer louvers 17 thereon.

DETAILED DESCRIPTION

In accordance with the present invention the apparatus 10 is provided with means 25 for supporting the louvers 17 at any desired level to form openings O of various sizes and means 26 operatively associated with the louvers 17 and the chain drives 11–11' for agitating the fruit during conveyance along the sizer flight thereof. In combination therewith louver supporting means and guards 27 and 28 at the receiving end R and discharge end D, respectively, of the apparatus serve to enable sizing immediately upon receipt of fruit and to continue sizing over the discharge end D of the apparatus 10.

Referring to FIG. 1 each of the sprockets 11 and 11' are of sufficient diameter to provide adequate space for the transverse conveyors 19, 20 and 21. Each flight F is identical and like reference numerals apply to the parts of each. Each flight F includes a mounting plate 30 formed as a special side of a link in the claim 11 and/or 11' of which it becomes a part. The plates 30 as best illustrated in FIGS. 3 and 4 are formed as one side of a link of such chain extended upwardly therefrom in the form of a square. The lower portion of the plate is provided with borings to receive the pins P of the roller chains. The upper portion of each plate 30 is similarly bored at 31 and 31' to provide a mounting for a cross rod 16 as well as the cross-shaft 32 for the agitating means 26.

The chains 11 and 11' each have their upper reach supported for level travel by the flange 33 of an angle iron 34 mounted in a horizontal position on suitable mounting blocks 35 secured by bolts 36 to the sidewalls of the frame 14. (FIGS. 3 and 4). This prevents the upper reaches of the chains 11–11' from draping or deflecting under the loads they are to carry. Moreover, it supports each flight F at a fixed horizontal plane during sizing of the fruit as determined by the angular disposition of the louver plates 17.

The louver plates 17 engage and are supported on independent gauge tracks 18 at each side of the machine. These gauge tracks, identified as I, II and III in FIG. 1 are at different levels relative to the fixed horizontal plane of travel of plates 17. To this end each gauge track I, II and III is supported on a bracket 37 at each of its ends. These brackets 37 extend outwardly of the apparatus to a boss formation 38 adjacent the sidewall of the frame 14 and beneath the mounting blocks 35 for the chain supporting angle iron 34. Each boss 38 has the lower end 39 of a threaded screw shank 40 rotatably supported therein so as to extend upwardly through a threaded bore 41 in the mounting block 35. The upper end 42 of each screw shank is squared for operation by a wrench to raise and/or lower the respective gauge tracks I, II and III relative to the fixed plane of travel of the flights F. Suitable lock nuts on the shank 40 secure the latter to the mounting block 35. It should here be noted that the bosses 38 have one flat face disposed for up and down sliding engagement with the sidewall of the frame 14. This in combination with the screw shanks 40 at each end of each gauge track assures accuracy in placement of the latter determined by the size of fruit to be dropped out at each stage.

Each louver plate 17 is hingedly mounted on the rod 16 having its ends secured to the trailing bore 31 in the upper portion of the mounting plate 30. The louver plates 17 thus glide in a trailing position by engagement with the gauge tracks 18 at the sides of the machine. This sets the trailing end 43 of each plate 17 at a desired elevation relative to horizontal such as to lend support to any fruit thereon. It also places the trailing end 43 of each plate 17 as a desired distance relative to an adjacent trailing flight F. Thus the opening O of a desired dimension is formed to allow fruit of less than that particular measurement to fall through to the transverse conveyor below.

In combination with the foregoing the agitator means 26 on each flight F forms one margin of each opening O relative to the trailing end 43 of each louver plate 17. The agitator means 26 comprises a roller member 44 rotatably mounted on the cross-shaft 32 of an adjacent trailing flight F. These rollers 44 have suitable bushings 45 at their center to provide a bearing around the shaft 32. The rollers 44 are preferably hard rubber having a roughened periphery such as by knobs 46 formed on their peripheries. The ends of the bushings 45 are secured to a sprocket 47 the teeth of which engage a length of chain 48 tightly strung the length of the machine in a plane parallel to and above the fixed horizontal plane of the upper reaches of the chains 11 and 11'. The arrangement is such that as each flight F comes up and around the main sprocket 12 at the receiving end R of the machine, a rack-and-pinion effect occurs between the tightly stretched stationery chain 48 and the sprockets 47. Thus each agitator roller 44 is caused to turn in an anticlockwise direction (FIGS. 1 and 3) to jiggle or otherwise disturb or upset bunching of the promiscuous mass of fruit relative to the trailing end 43 of the adjacent louver plate 17. This assures complete freedom of the fruit during conveyance without undue bruising so that fruit that can pass through the opening O at that stage will fall through and be separated out.

OPERATION

Referring to FIG. 1 the louver plate 17 of each flight F hangs down from its supporting cross rod 16 until the latter arrives at its fruit-supporting table level. At that time the trailing end 43 of each plate engages a guard 27 which partially curves over the 12 o'clock zone of the sprocket 12 at the receiving end R of the apparatus. This guard 27 extends down diagonally toward the first transverse conveyor 19 nearest the receiving end R of the machine.

The fruit is supplied as a promiscuous mass via the chute C which discharges into the space between the first and second flight F entering table level. At this stage the louver plates 17 are supported at their ends on the gauge track I which is set at the highest level. Thus the opening O between the louver plate 17 and the adjacent trailing agitator roller 44 is narrowest. At this stage only the smallest fruit drops through the transverse conveyor 19. The length of the gauge track I is such as to support the louvers 17 at such angle for several flight lengths thus giving the rotating agitator roller 44 time to break up any bridging or bunching of the fruit to assure that all fruit within the limits of the narrowest opening O will be separated out.

Over the second transverse conveyor 20 the louver plates 17 drop down by reason of their ends passing the first gauge track I and engaging the second gauge track II at the next lower level. Thus the opening O between the trailing end 43 of each louver plate and an adjacent trailing roller 44 becomes wider to a degree. This allows fruit of the next selected size to drop through while all fruit of larger diameter than the gap of the opening O pass on to the next stage. At the third stage the third gauge track III which is set at the next lower level allows the louvers 17 to drop by another degree of fruit size variance to allow the smallest fruit, of those remaining on the table level, to fall through to the third transverse conveyor 21. Additional stages may be added as needed or desired for obtaining greater selectivity of fruit according to size.

The largest fruit remaining at the table level ultimately rest upon the upper zone of the guard 28 covering the space between the drive sprockets 13–13' at the discharge end D of the machine. This guard cover 28 has a diagonal portion 51 for deflecting the fruit falling through at the last stage III toward the transverse conveyor 21. The guard cover 28 also establishes an orbital louver and fruit support 52 adjacent the discharge end D of the machine. By this support 52 the louvers 17 are preventing from falling by gravity into a pendant position until they pass center of the drive shaft 15'. This assures proper positioning of each louver plate 17 incident to their arrival at the receiving end R of the machine.

The largest fruit arriving at the discharge end D of the machine are supported upon the orbital support 52 of the guard 28 and a louver plate 17 engaging the same until the louver plate 17 assumes a slanted condition comparable to that of a discharge chute 53. At that time the remaining fruit will roll down the inclined plane thus provided and into the discharge chute 53.

I claim:

1. In a fruit-grading apparatus having a series of flights of rollers and progressively openable drop-flap louvers movable along a relatively fixed path by the upper reaches of a pair of chains trained around sprockets at the receiving and discharge ends of a frame and in which said rollers have pinions in drive connection with stationary racks on each side of said frame whereby a promiscuous mass of fruit and the like is progressively separated according to size at different stages therebetween, the combination therewith of flight means for mounting said louvers and rollers in spaced relation on said chain and each comprising in combination:
   a. a pair of mounting plates each forming a part of a link on each of said chains on transversely opposite sides of said path;
   b. a cross rod transversely of said frame and having its ends supported in said pair of mounting plates for pivotally supporting one edge of one of said louvers for free-hanging movement therefrom;
   c. independent guide tracks at each side of said frame engageable by the adjacent sides of the trailing edge of said louver for supporting the latter at a different angle relative to said fixed path at each stage therealong; and
   d. a cross-shaft for said rack-and-pinion driven roller and journaled on said pair of mounting plates in advance of said cross rod for supporting one of said rollers in spaced relation to the trailing edge of a leading louver supported on the flight means in advance of said pair of mounting plates for forming one margin of a dropout opening relative to such leading louver.

2. The apparatus in accordance with that of claim 1 in which each of said independent guide tracks includes:
   a. a pair of brackets each having its inner end secured to the underside of said guide track adjacent opposite ends thereof;
   b. said brackets extending outwardly of said path and having a boss formation disposed for guided up-and-down movement adjacent the sidewall of said frame;
   c. a screw shank having its lower end mounted on and for rotation with respect to said boss formation; and
   d. a mounting block secured to said sidewall of said frame above said base formations on said brackets and having threaded bores for threaded connection to said screw shanks for raising and lowering said guide tracks in parallel relation to said path.

3. The apparatus according to that of claim 2 in which each of said rollers has a roughened periphery.

4. The apparatus of claim 3 in which the roughened periphery of each of said rollers comprises a plurality of knobs formed thereon.

5. The apparatus in accordance with that of claim 1 in which each of said rollers have a roughened periphery and turns upwardly and outwardly relative to the dropout opening of which it is one margin to upset bunching of the fruit relative to the trailing end of the louver of an adjacent leading flight.